United States Patent
McNulty et al.

(10) Patent No.: US 7,290,827 B2
(45) Date of Patent: Nov. 6, 2007

(54) INTEGRATED ROLL-FORMED FRONT AND BED PANEL FOR VEHICLE BOX ASSEMBLY

(75) Inventors: Frank G. McNulty, Rochester Hills, MI (US); D. James Zimmerman, Grosse Ile, MI (US); Michael David Lund, Metamora, MI (US)

(73) Assignee: Pullman Industries, Inc., Troy, MI (US)

( * ) Notice: Subject to any disclaimer, the term of this patent is extended or adjusted under 35 U.S.C. 154(b) by 0 days.

(21) Appl. No.: 11/212,242

(22) Filed: Aug. 26, 2005

(65) Prior Publication Data

US 2006/0082191 A1 Apr. 20, 2006

Related U.S. Application Data

(60) Provisional application No. 60/618,894, filed on Oct. 14, 2004.

(51) Int. Cl.
*B62D 33/02* (2006.01)
(52) U.S. Cl. ............................... 296/183.1; 296/181.4; 296/182.1
(58) Field of Classification Search ............. 296/183.1, 296/181.3, 181.4, 182.1, 184.1, 186.1, 182.4
See application file for complete search history.

(56) References Cited

U.S. PATENT DOCUMENTS

| | | | | |
|---|---|---|---|---|
| 5,575,525 A | * | 11/1996 | Walworth et al. | 296/184.1 |
| 5,730,486 A | * | 3/1998 | Jurica | 296/184.1 |
| 6,439,649 B1 | * | 8/2002 | Lorenzo et al. | 296/181.3 |
| 6,575,524 B2 | * | 6/2003 | Grimm et al. | 296/181.3 |
| 6,644,721 B1 | * | 11/2003 | Miskech et al. | 296/183.1 |
| 6,702,365 B2 | * | 3/2004 | Semple et al. | 296/183.1 |
| 2003/0218360 A1 | * | 11/2003 | Henderson et al. | 296/183 |
| 2006/0097548 A1 | * | 5/2006 | Kikuchi et al. | 296/183.1 |

\* cited by examiner

*Primary Examiner*—Lori L. Lyjak
(74) *Attorney, Agent, or Firm*—Flynn, Thiel, Boutell & Tanis, P.C.

(57) ABSTRACT

An improved vehicle box assembly with an upright front panel part and a horizontal floor panel part defined by a monolithic one-piece roll-formed steel sheet member having a desired three-dimensional configuration. The sheet steel member is roll-formed in the lengthwise direction thereof to define a plurality of parallel stiffening ribs. The roll-formed member is thereafter transversely bent to define both front and floor panel parts.

6 Claims, 11 Drawing Sheets

INTEGRATED ROLL-FORMED FRONT AND BED PANEL FOR VEHICLE BOX ASSEMBLY

CROSS REFERENCE TO PRIOR APPLICATION

This application claims priority under 35 USC §119(e) of provisional application Ser. No. 60/618,894 filed Oct. 14, 2004, the entire disclosure of which is herein incorporated by reference.

CROSS-REFERENCE TO RELATED APPLICATION

This application is related to provisional application Ser. No. 60/561,803 filed Apr. 13, 2004, the entire disclosure of which is herein incorporated by reference.

FIELD OF THE INVENTION

This invention relates to a box assembly for a vehicle, such as a pickup truck, and more specifically to an improved construction of a vehicle box assembly employing at least one unitary and monolithic roll-formed panel which has alternating parallel grooves and channels extending in the lengthwise direction and which after roll-forming is transversely bent through a substantially 90° angle to define a main horizontal part having a width which extends generally at least between the wheel wells of the vehicle box assembly so as to function as the load-bearing bed, and which horizontal part joins through the 90° bend to an upright part which is of corresponding width and projects upwardly to define at least a significant width of the upright front wall of the box assembly. This invention also relates to the method of constructing a vehicle box assembly employing a monolithic one-piece roll-formed panel which functions to define both the upright front wall and the bed of the box.

BACKGROUND OF THE INVENTION

The upwardly-opening box assembly associated with vehicles such as pickup trucks and the like have, for many years, employed a large plurality of stamped metal panels for defining the box. For example, in most instances the front and side panels of the box are stamped sheet steel members, and in most instances the bed of the box is also defined by one or more stamped sheet-like steel panels. Forming the box predominantly from stamped sheet steel panels, however, results in structural and economic factors which are less than desirable.

A principal disadvantage associated with using stamped sheet steel panels is the fact that such panels require use of a greater quantity of material than is optimally desired, and also ultimately results in the formed members having greater weight than desired, both of which are undesirable from the standpoint of the overall vehicle. More specifically, it is known that stamping involves forming a three-dimensional shape from a flat sheet steel of rather thin gauge, and during stamping the three-dimensional deformation of the sheet steel necessarily causes stretching of the steel, particularly at those locations which are subjected to the greatest three-dimensional deformation. This stretching can typically be in the range of from 8% to 10%, and the net effect is that the thickness of the sheet steel at the stretched locations can be significantly reduced by this degree. Such significant thickness reduction hence results in areas of the sheet being of significantly reduced strength, and hence these reduced strength areas can dictate and control the design of the overall stamped part, thereby requiring initial use of a sheet thickness greater than would otherwise be required so as to compensate for the thickness reduction caused by stretching.

Stamping large sheets to define large three-dimensional panels, such as for a vehicle box assembly, also often results in undesired surface stretch marks or blemishes in the finished product. The stamping operation also typically requires that the sheet be significantly oversized relative to the finished product so as to permit trimming of the sheet around the entire peripheral edge of the finished stamped member, and this hence results in significant waste.

A further and significantly disadvantageous factor associated with use of stamped sheet steel panels for vehicle box assemblies is the cost associated with the manufacture of the required stamping tools, and the significant number of such tools required to form the different stamped panels. Since the stamped panels defining the front and side walls of the box assembly, as well as the bed, are all of rather large size, the stamping tool required to form a single panel is necessarily large and complex, and hence extremely costly to manufacture. The complexity associated with such tooling is further increased by the fact that the side and front panels typically have reinforcing channels formed along the upper edges thereof, which channels define either inverted U-shaped configurations or sometimes even a closed hollow channel, whereby the stamping tooling for such shapes involves multiple stamping steps and hence is complex and expensive.

The cost of the stamping tooling is further exacerbated by the fact that each stamped part requires its own customized stamping tooling. For example, the front panel, the right side panel and the left side panel of the bed assembly all require their own customized tooling. Further, different tooling must be provided to permit manufacture of the right and left side panels for each different bed length. Needless to say, the overall net effect is that the tooling is not only extremely costly, but the tooling also requires significant floor space in the factory, and additional labor for operation thereof.

Several currently known constructions for vehicle box assemblies employing a significant number of stamped sheet steel panels are illustrated by FIGS. 1-4. In FIG. 1, a box assembly 10 as associated with a pickup truck employs right and left upright inner side panels 11 and 12, respectively, joined to an upright front panel 13. The bottom of the box assembly is closed by a generally horizontal bed 14 which, in this conventional construction, employs a multiple-piece construction defined predominantly by a center bed panel 15 which extends throughout the full length of the bed and has a width which generally corresponds to the transverse width between the wheel well openings. The bed regions forwardly and rearwardly of the wheel well openings are defined by separate small bed panel sections 16 and 17 which are rigidly joined, as by welding, to the center bed panel 15 and to the adjacent upright side panels. The rear of the bed assembly defines a conventional access opening which, in a known manner, is closed by a swingable tailgate. In this known construction of the bed assembly, each of the front panel, right side panel, left side panel and bed are formed as stamped steel sheet members, all different, and in fact the bed in this example is formed by a plurality (here five) of stamped members. The wheel well covers 18, which are also typically separate stampings, are welded to the respective side panel and to the bed during the assembly process. A box assembly having constructional features similar to that illustrated by FIG. 1 hence employs a large number of different stamped members, and accordingly requires large investment in tooling as well as significant factory space for production and assembly of such construction.

FIG. 2 illustrates another known construction of a box assembly which is virtually identical to the box assembly of FIG. 1 described above, except that the bed 14' in FIG. 2 is constructed as a one-piece stamped panel having wheel well openings formed in opposite sides thereof, typically by means of a separate stamping operation, thereby eliminating the need for separate side bed panels. The construction of the box assembly of FIG. 2 is in all other respects generally similar to that illustrated by FIG. 1, and hence possesses generally the same structural and cost disadvantages.

Referring now to FIG. 3, there is illustrated improvements with respect to a box assembly for a pickup truck, which improvements are illustrated in greater detail in U.S. Pat. No. 6,644,721, owned by the Assignee hereof. The box assembly illustrated in FIG. 3 is constructed generally the same as the box assembly shown in FIG. 1 except that the center floor pan 15 in FIG. 3 is constructed as a one-piece roll-formed member which provides improved performance and weight reduction.

Considering also the box assembly illustrated in FIG. 4, this depicts another improved construction of the box assembly developed by the Assignee hereof. This improved box construction generally corresponds to the box construction of FIG. 2 except that the full-sized bed member 14' is constructed as a roll-formed member, rather than as a stamped member. This roll-formed construction of the one-piece bed member, as disclosed in greater detail in Assignee's U.S. Pat. No. 6,128,815, has been successfully commercially adopted and is currently in use on models of pickup trucks currently being sold.

As a known alternative construction for the box assembly illustrated by FIG. 1, the side panel, the adjacent wheel well cover and adjacent front and rear side bed panels can be formed as a one-piece stamping, a different such stamping being required for each of the right and left sides of the box assembly. Such stamping, however, due to its size and complex three-dimensional shape, requires complex and costly tooling.

Accordingly, it is an object of this invention to provide an improved roll-formed component part for a vehicle box assembly, specifically a monolithic one-piece roll-formed panel member which is also transversely bent into an L-shaped longitudinal configuration so as to form both front and bed panels, which component part is believed to provide improved characteristics with respect to construction, assembly and cost efficiencies with respect to materials, assembly and tooling, and which at the same time retains or provides improved performance characteristics with respect to the assembled box assembly.

More specifically, the improved roll-formed component of the present invention is believed to provide the assembled box assembly with improvements with respect to reduction in overall weight, reduction with respect to overall usage of material, reduction with respect to material cost, simplification with respect to required assembly, handling and manipulation, significant reduction with respect to tooling costs, and an ability to utilize the same tooling to facilitate manufacture of multiple or different sized parts.

According to the present invention there is provided an improved monolithic one-piece roll-formed panel member for a vehicle bed assembly, which panel member during roll-forming thereof is provided with alternating grooves and ribs extending lengthwise of the panel member in parallel relationship, which alternating grooves and ribs are disposed sidewardly across a significant width of the panel member. After roll-forming of the panel member in the form of a substantially continuous elongate sheet, the sheet is transversely cut to define flat panel members of desired length, which length corresponds generally to the length of the vehicle bed as well as the height of the front side wall of the box assembly. The monolithic flat panel member is thereafter bent transversely thereacross through a generally 90° angle so as to define a first elongate and generally horizontal panel part which functions as a bed for the box assembly, and which is integrally and monolithically joined through the 90° bend to a shorter upright panel section which is of lesser longitudinal extent and which functions as a front side wall for the box assembly. The alternating ribs and grooves as roll-formed in the panel member extend vertically throughout the front side panel part and thence extend through the 90° bend so as to project longitudinally in the lengthwise direction of the bed panel part so as to effectively terminate at the rear edge thereof.

In the improved construction as described above, the roll-formed panel member may have a width which generally corresponds to the width of the box assembly so that the bed and front panel parts both generally correspond to and occupy the full width of the box assembly. In this variation the side portions of the bed panel part may have wheel well openings formed therein, such as by a stamping operation, to permit securement to and cooperation with separate wheel well housings. In a preferred form of this variation, the side portions of the roll-formed panel member are preferably flat (i.e., free of roll-formed ribs and grooves) so as to leave a flat edge around the wheel well opening to facilitate securement to the wheel well housing. Alternatively, in a preferred embodiment, the roll-formed panel member defining the bed and front wall panel parts may have a width which more closely corresponds to the width between the wheel well housings, in which case the box assembly is provided with front and rear bed sections (either separate from or integrally joined to the side wall panel) cooperating with the wheel well housing and the roll-formed bed panel, as well as front panel end extenders which cooperate with the roll-formed front panel so as to permit forming of the vehicle box assembly.

According to the present invention, there is provided an improved box assembly for a vehicle, such as a pickup truck, which box assembly employs a roll-formed bed panel and a roll-formed front panel which is integrally and monolithically joined to the bed panel through an approximately 90° bend section which extends transversely across the panel, and which may additionally employ a roll-formed upright side panel. The roll-forming of large panel members associated with the box assembly permits minimal usage of material in terms of both square footage of material as well as material thickness, thereby minimizing cost and weight of the box assembly, and results in panels of substantially uniform thickness throughout the longitudinal transverse directions thereof. The use of roll-formed panels is also desirable since it permits the panels to be formed from high strength steel if desired, specifically sheet steel having a yield strength in the range of from about 50,000 psi to about 100,000 psi, which high strength steel is typically not feasible for use with large stamped panels.

Other objects and purposes of the invention will be apparent to those familiar with constructions and processes similar to those described herein upon reading the following specification and inspecting the accompanying drawings.

Figure 2:
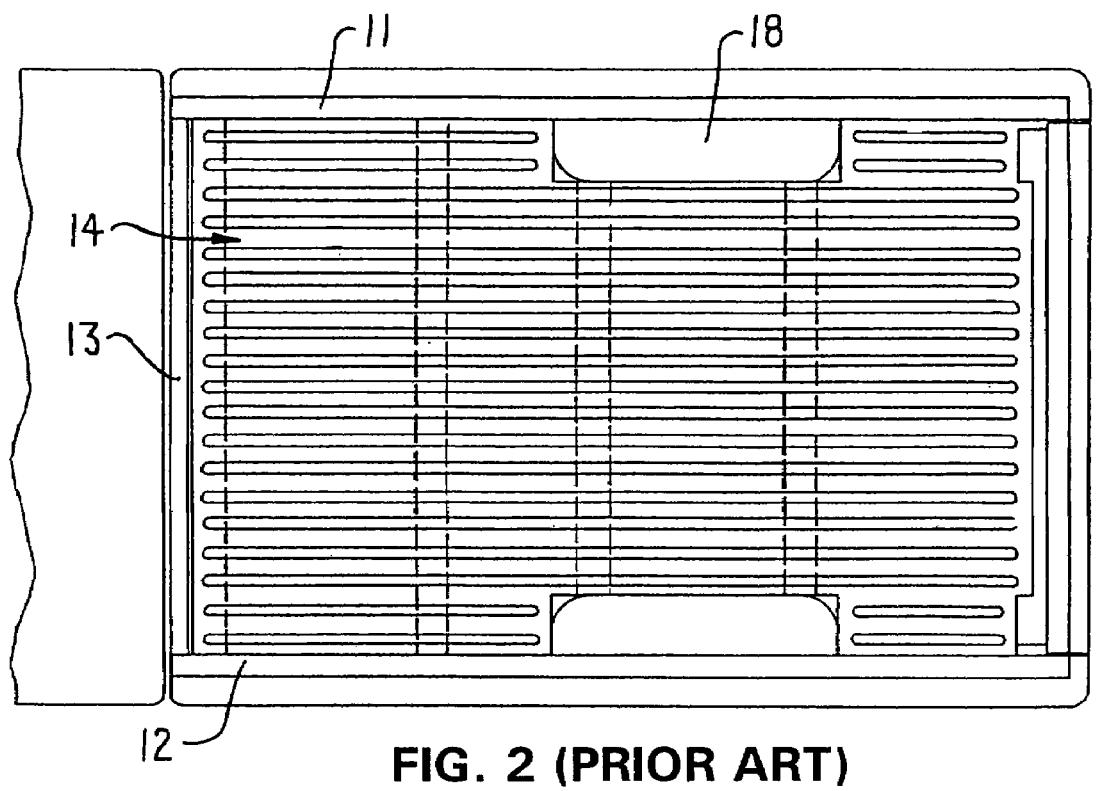
FIG. 2 is a top plan view similar to FIG. 1 but illustrating a second conventional construction of the box assembly.
Figure 1:
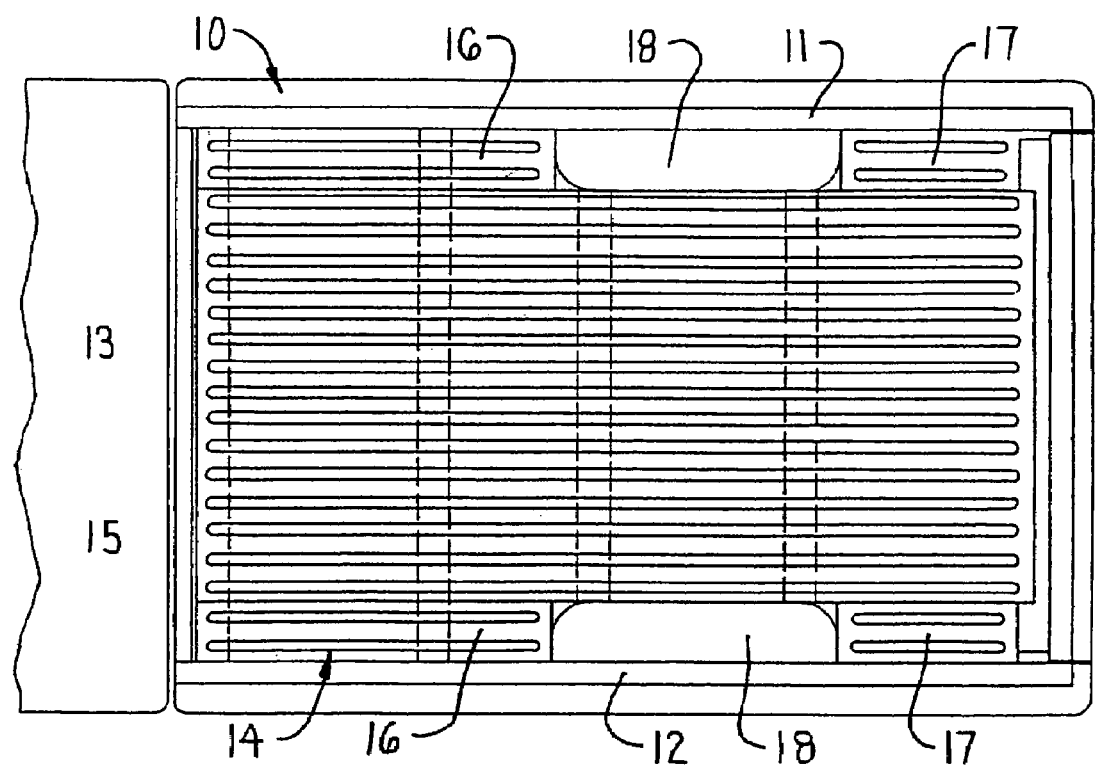
FIG. 1 is a top plan view of a conventional pickup truck box assembly which illustrates a first conventional construction of the assembly.
Figure 4:
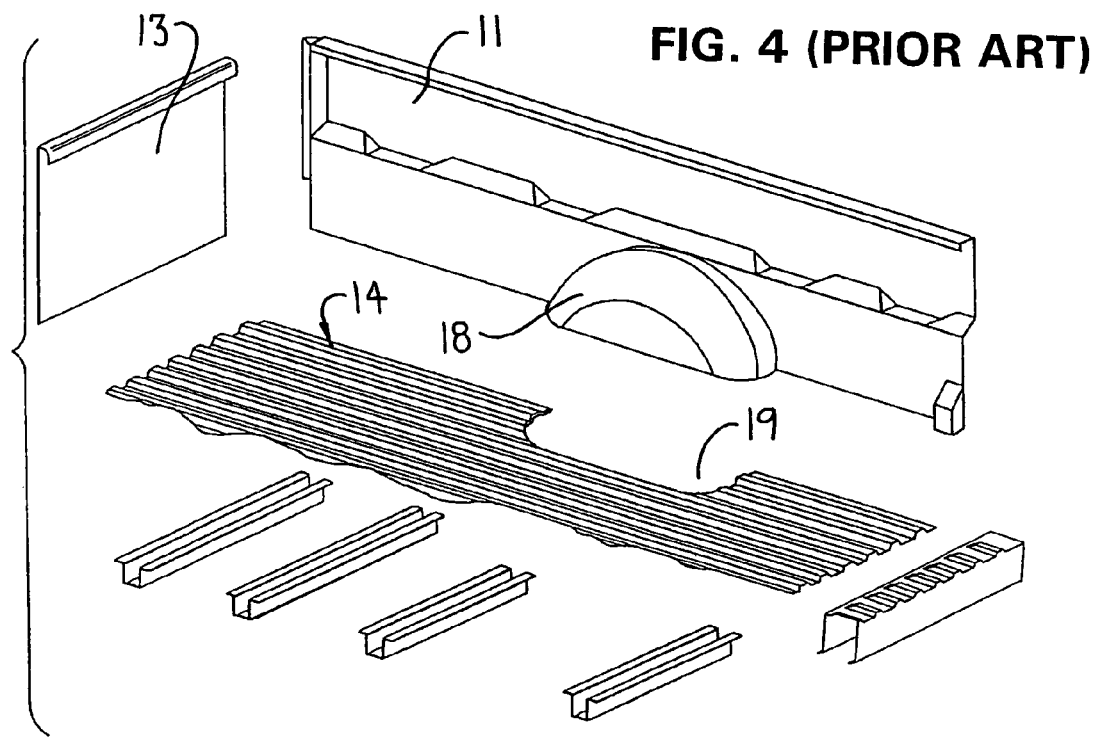
FIG. 4 is an exploded perspective view illustrating the box assembly of FIG. 2 but illustrating a known variation of the bed assembly.
Figure 3:
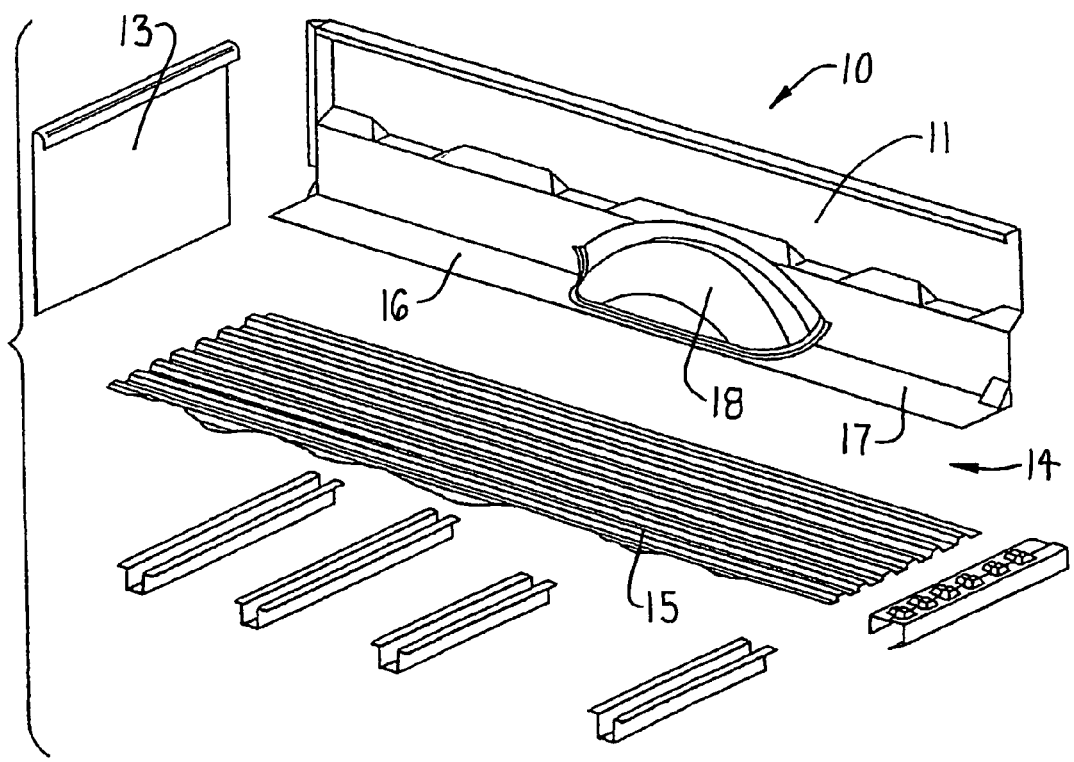
FIG. 3 is an exploded view of a box assembly corresponding generally to FIG. 1 but illustrating a known variation of the bed assembly.

Certain terminology will be used in the following description for convenience in reference only, and will not be limiting. For example, the words "upwardly", "downwardly", "rightwardly" and "leftwardly" will refer to directions in the drawings to which reference is made. The word "upwardly" will also be used in reference to the surfaces associated with the box assembly which project upwardly when the box assembly is in its normal assembled position on a vehicle. The words "front" and "rear" will be used with reference to those directions which normally connote the front and rear of a vehicle when the box assembly is mounted thereon. The words "inwardly" and "outwardly" will refer to directions toward and away from, respectively, the geometric center of the box assembly, or designated parts thereof. Said terminology will include the words specifically mentioned, derivatives thereof, and words of similar import.

DETAILED DESCRIPTION

Figure 5:
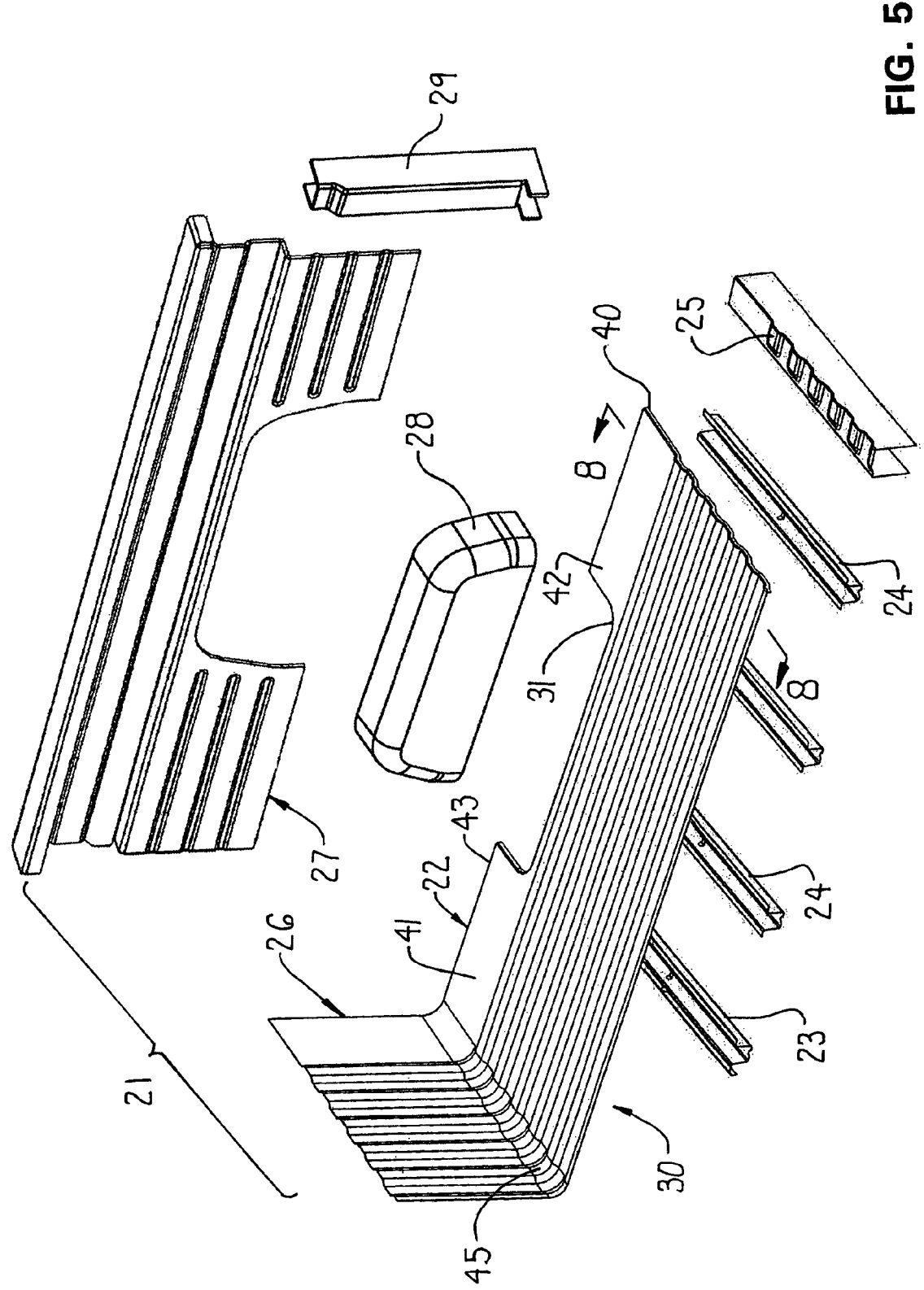
FIG. 5 is an exploded fragmentary perspective view showing parts associated with an improved vehicle box assembly constructed in accordance with the present invention.
Figures 6, 7:
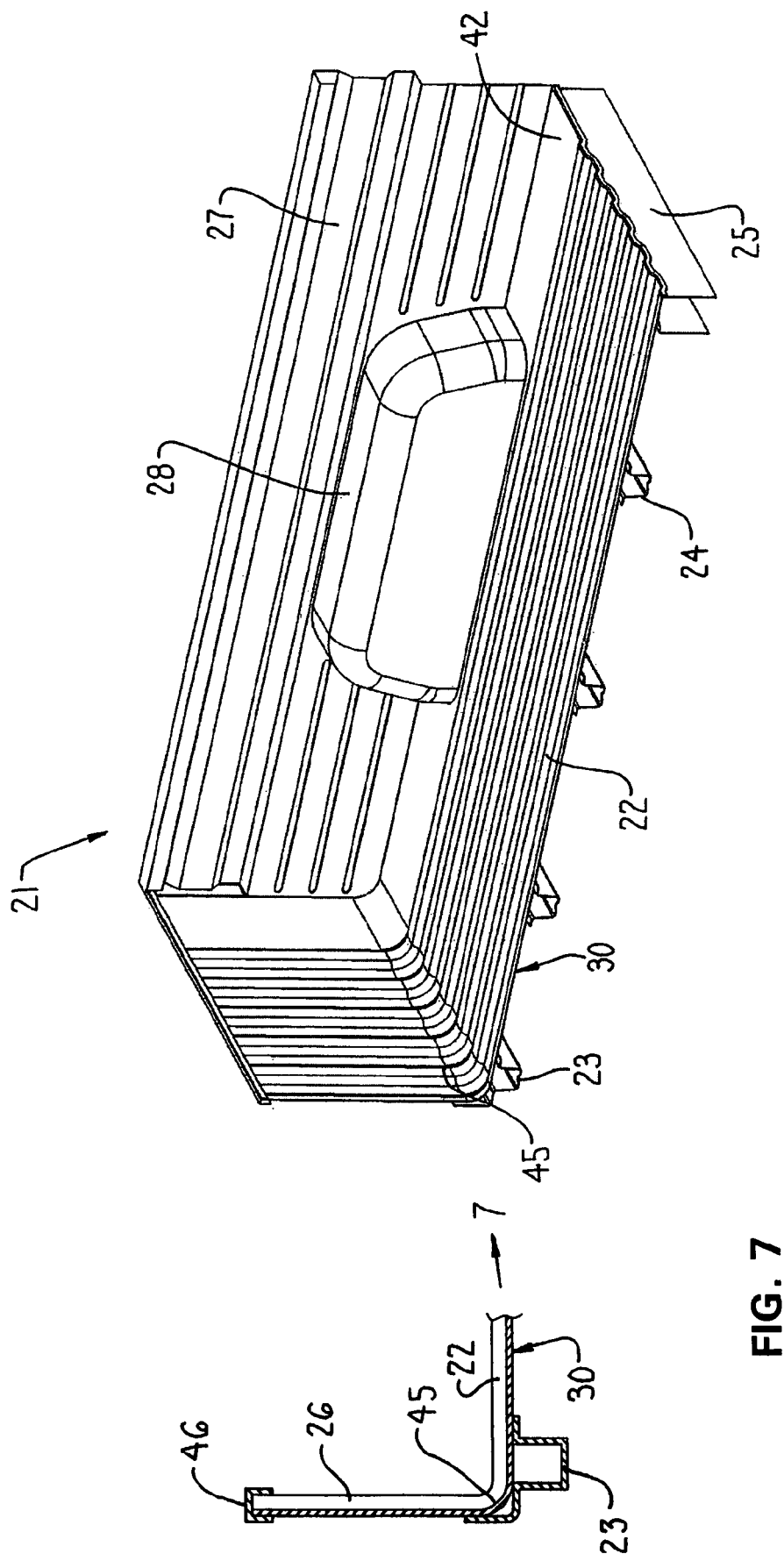
FIG. 6 is a fragmentary perspective view showing the parts of FIG. 5 in an assembled condition.
FIG. 7 is an enlarged fragmentary cross-sectional view as taken in the direction of arrow 7 in FIG. 6.

Referring to FIGS. 5 and 6, there is illustrated a first embodiment of an improved vehicle box assembly 21, specifically a box assembly for a pickup truck, according to the present invention.

The box assembly 21 includes a bed or floor pan arrangement 22 which is supported on a plurality of support or cross rails 22 extending transversely thereunder, including a front cross rail 23 disposed adjacent the forward end of the floor, one or more generally parallel intermediate cross rails 24 disposed in rearwardly spaced but generally parallel relationship beneath the floor, and a rear cross rail 25 which supportingly engages the floor beneath the rear edge thereof. An upright front panel 26 projects upwardly from the floor adjacent the front end of the box assembly, and opposed right and left upright side panels 27 project upwardly from opposite sides of the floor and have their forward edges rigidly joined to opposite ends of the front panel 26. Only the right side of the box assembly is illustrated in FIGS. 5 and 6, the left side being omitted for clarity of illustration, but it will be understood that the left side of the box assembly is typically substantially a mirror image of the right side as shown. The floor 22 and side wall panels 27 are each rigidly joined by a hollow three-dimensional wheel well cover or housing 28 which around the edge thereof is fixedly joined to both the side wall and the floor so as to isolate the rear wheel of the vehicle from the interior of the box assembly. Each upright side wall 27 also has a rear post or upright 29 associated with the rear edge thereof to provide structural reinforcement. The rear post provides a structural connection between the inner side panel 27 and the outer skin of the vehicle, and also provides strength to permit support for a conventional rear tailgate as associated with the box assembly.

The construction of panel components of the box assembly 21, namely the bed 22 and front panel 26, will be described hereinafter.

Referring first to the bed or floor 22, it is preferably constructed as a monolithic one-piece roll-formed member having a series of reinforcing channels or ribs which project upwardly from the sheet and extend lengthwise so as to terminate substantially adjacent the front and rear edges of the bed, with the channels being spaced apart in the sideward or transverse direction of the bed member. The bed member 22 in this embodiment extends the full width of the box assembly so that the side edges of the bed member terminate directly adjacent the side panels 27, and the side edges of the bed member have wheel well openings 31 formed therein to accommodate the rear vehicle wheels. The wheel well openings 31 are enclosed by conventional wheel well covers 28, the latter typically being of a stamped construction. The rear edge of the bed 22 cooperates with the rear cross rail 25 which, in a preferred construction, can be provided with a series of sidewardly spaced upward projections which nestingly cooperate with the channels associated with the bed so as to reinforce the rear bed edge. Use of projections associated with the rear rail for nesting cooperation with the rear edge of the bed is, however, optional.

This construction of the bed 22 is explained in greater detail in U.S. Pat. No. 6,128,815 owned by the Assignee hereof.

Figure 8:
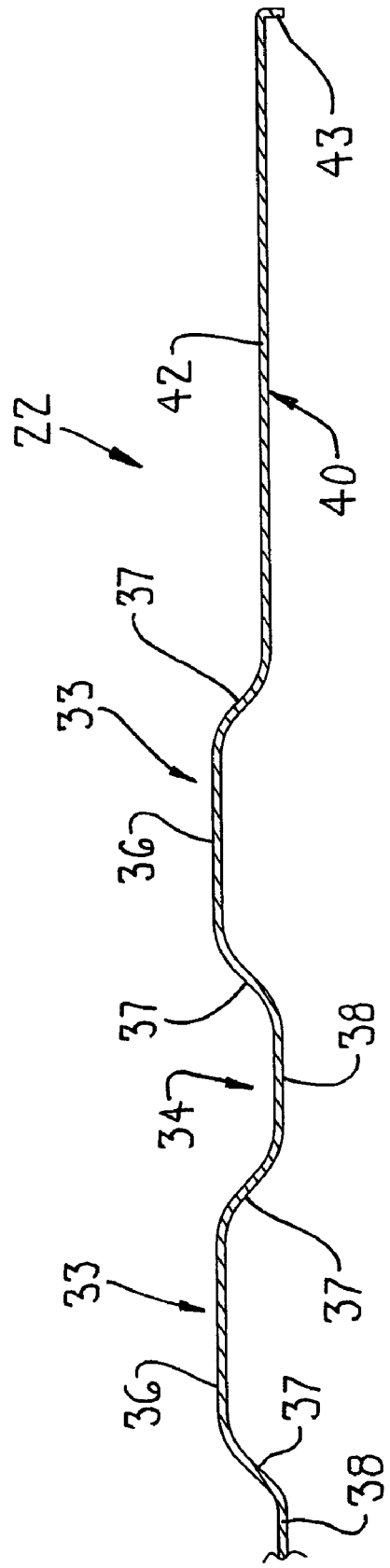
FIG. 8 is an enlarged fragmentary cross-sectional view as taken generally along line 8-8 in FIG. 5.

Referring to FIG. 8, there is illustrated in greater detail a preferred cross-sectional view through the ribs and valleys which are roll-formed lengthwise of the bed 22. The roll forming preferably creates a plurality of generally parallel and sidewardly spaced channels or ribs 33 which protrude upwardly and extend lengthwise of the bed member, and which are sidewardly spaced apart by intermediate grooves or recesses 34. The channel or rib 33 preferably has a generally flat top wall 36 which, at opposite side edges, is joined to a pair of side walls 37 which flare or taper outwardly and downwardly for joinder to the bottom walls 38 of the adjacent grooves 34. The opposite ends of the tapered side walls 37 are, as illustrated, preferably provided with a rounded curvature or radius where they join to the flat walls 36 and 38 to provide improved performance and appearance. In a preferred construction the channels 33 have the top walls 36 thereof provided with a width which is substantially greater than the width of the valley base walls 38. This permits the overall planar support area of the bed, as defined by the total area of the top walls 36, to be of large magnitude to thus facilitate utilization of the vehicle bed since these upper surfaces 36 effectively define the load engaging plane of the bed.

In the construction illustrated by FIGS. 5-8, the bed 22 includes a side portion 40 which extends inwardly from and along each side edge 43 and which permits forming of the wheel well opening 31 therein. This results in front and rear secondary bed sections 41 and 42 which protrude inwardly from the edge 43 by a transverse width which corresponds to or slightly exceeds the transverse width of the wheel well opening 31. These bed sections 41 and 42 are respectively defined forwardly and rearwardly of the wheel well opening 31. The edge section 40 of the roll-formed bed member, as illustrated in FIG. 8, is preferably left in a flat condition, that is, it is not provided with roll-formed ribs therein during the roll forming operation. This flat edge section 40 hence significantly facilitates the forming of the wheel well opening 31 thereon, thereby leaving a generally flat planar edge around the wheel well opening, which also subsequently facilitates the attachment, as by welding, of the wheel well housing 28 to the edge of the wheel well opening 31.

While the edge portion 40 of the bed member, which includes the front and rear portions 41 and 42, is preferably not subject to formation of channels or ribs therein during the roll forming operation, it will be appreciated that these sections can be provided with channels or ribs roll-formed therein if considered necessary or desirable.

In the improved construction of the present invention, the upright front panel 26 is also of a roll-formed construction having a series of reinforcing channels or ribs projecting vertically upwardly therealong, the latter effectively being extensions of the channels or ribs 33 associated with the bed 22. More specifically, the bed 22 and front panel 26 are effectively defined by a monolithic, one-piece panel member 30 which is initially roll formed in a straight condition from flat sheet steel so that the panel member 30 has the reinforcing channels or ribs 33 and intermediate valleys 34 extending lengthwise throughout the longitudinal extent thereof. After the roll-formed panel member 30 has been cut to length (which length corresponds to the longitudinal length of the bed 22 plus the height of the front panel 26), then the roll-formed panel member 30 is bent perpendicularly across the width thereof to define a generally rounded 90° bend section 45. This thus results in the front panel 26 projecting upwardly in generally perpendicular relationship to the bed 22, but constituting an integral and monolithic upward extension from the front end of the bed through the bend section 45. The resulting front panel 26 hence has the channels 33 extending vertically throughout the height thereof, thereby providing the front panel 26 with significantly improved strength and rigidity in comparison to conventional stamped front panels.

With this construction, the upper edge of roll-formed front panel 26 can have an additional stamping operation formed thereon if desired, subsequent to roll forming of the flat panel member, so as to define a reinforcing flange or channel extending along the upper edge of the front panel 26. Alternately, a separate member, such as a channel member 46 as shown in FIG. 7, can be disposed to extend along the upper edge of the front panel 26 and be suitably fixed thereto, such as by welding.

While the side panel 27 illustrated in FIG. 5 is also preferably of a roll-formed construction, as explained in greater detail in co-pending application 60/561,803, it will be appreciated that the side panel 27 could be of stamped construction if desired.

The roll forming of the flat panel member 30 will be briefly described with reference to FIG. 9.

A steel sheet is normally supplied in the form of a large coil 51 as provided on a coil feed rack 52 which can be positioned adjacent a cradle 53 onto which the coil 52 can be transferred for support during the manufacturing operation. The cradle 53 has conventional structure associated therewith so as to effect straightening of the sheet material as it is discharged therefrom in the form of a substantially continuous metal sheet 54. The sheet material is fed through a combined end shear/welder 56 which trims the leading and trailing ends of each coil and welds the trimmed trailing end of one coil to the leading trimmed end of the next coil so as to permit a substantially continuous sheet 54 to be fed into and through the subsequent manufacturing stations.

After passing through the shear/welder 56 the continuous steel sheet 54 progressively moves through a conventional multi-stage roll mill or roll former 57 which progressively reforms the steel sheet 54 so that, while the steel sheet is substantially flat when entering the leading end of the roll mill 57, the steel sheet is suitably deformed so as to have the finished cross section of the bed 22 and front panel 26 (as shown in FIG. 8) when leaving the discharge end of the mill 57. The progressive reforming of the steel sheet as it passes through the mill 57 is diagrammatically illustrated by the progressive decreasing width of the steel sheet as it moves longitudinally through the mill.

Upon leaving the roll mill 57, the continuous but deformed steel sheet 58 has the cross section of the bed 22 and panel 26 as illustrated in FIG. 8, and if desired can then be fed through a stamping station (not shown) to permit formation of the wheel well openings 31 through the non-deformed side portions 40 of the steel sheet at uniform spaced intervals therealong. Alternatively, the wheel well openings can be stamped or formed in the side portions 40 during a subsequent forming operation, such as after the deformed sheet 58 is cut to length. The continuous deformed steel sheet 58 departing the roll mill 57 is fed into and through a cutoff press 59 which cuts the deformed steel sheet 58 at desired spaced distances corresponding to the length of the bed 22 combined with the height of the front panel 26. The individually cut roll-formed panels 30', while still in a generally flat condition, are discharged from the cutoff press 59 and can be moved away from the press in a conventional manner, such as by a conveyor 61.

The flat roll-formed panel 30' can then be moved to a subsequent processing station, such as indicated at 62, which effects transverse bending of roll-formed flat panel 30' generally along the line 45' to hence effect creation of the L-shaped panel member 30 which thus defines the bed and panel sections 22 and 26 respectively joined through the integral and monolithic bent section 45 as illustrated in FIG. 5. With this monolithic one-piece construction of the bed 22 and front panel 26, the non-rolled side sections 40 of the panel extends through the bend section 45 and project upwardly so as to define end portions of the front wall panel 26, which end portions are free of ribs or channels consistent with the flat wall defined by the bed sections 41 and 42.

Figure 9:
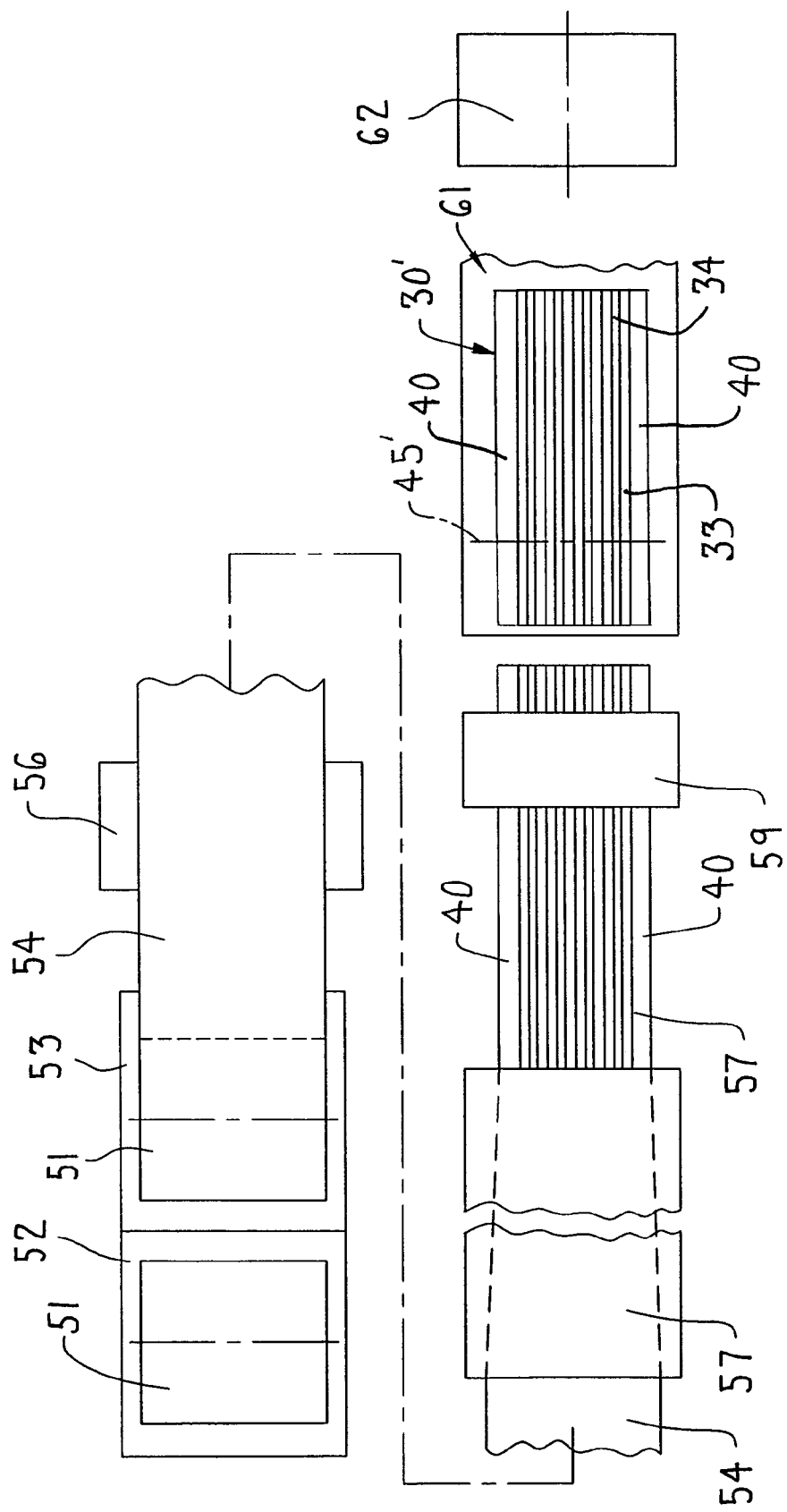
FIG. 9 is a flow diagram which diagrammatically illustrates the forming process for the roll-formed monolithic panel member which defines both bed and upright front panel portions of the box assembly.
Figure 10:
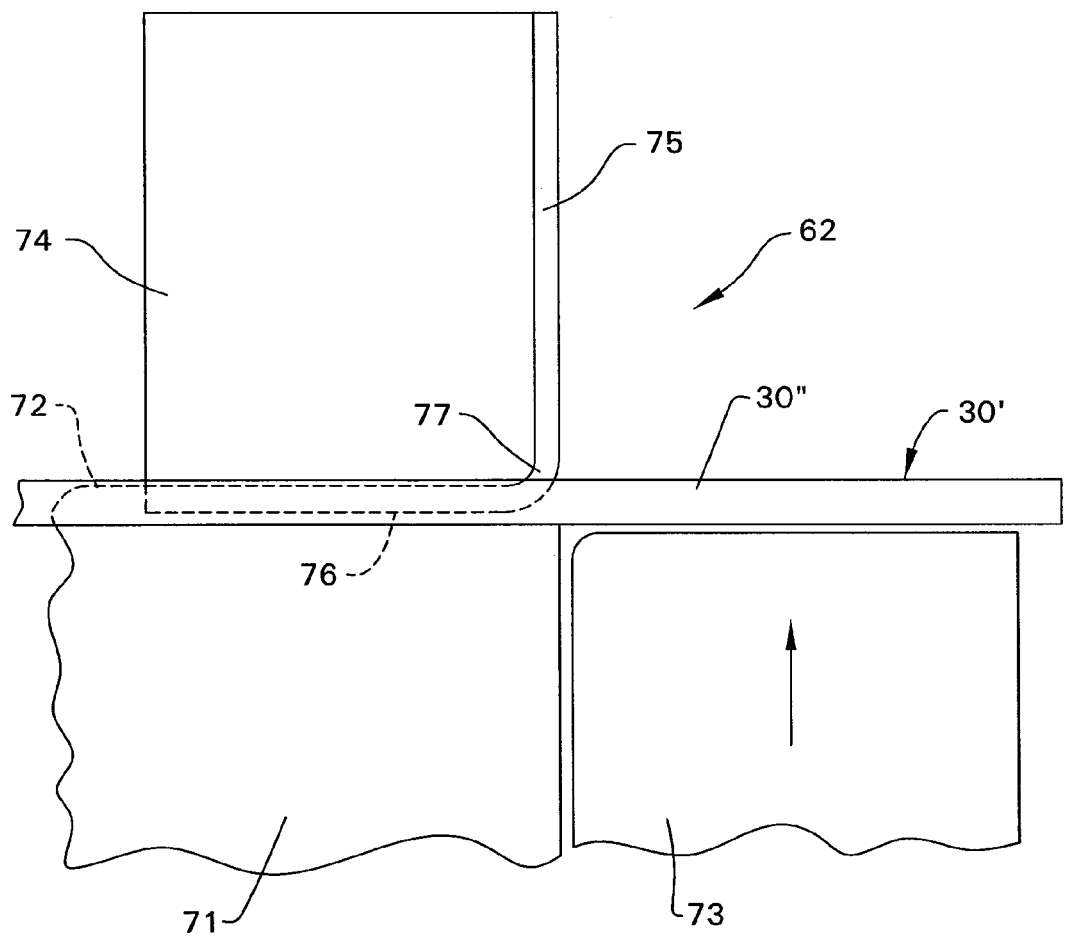
FIG. 10 is a diagrammatic view which illustrates a bender for transverse bending of the roll-formed flat panel.

Regarding the forming of the substantially 90° bend section 45 by means of a bending device as indicated at 62 in FIG. 9, such bending device 62 may assume many different configurations but will preferably involve features similar to a conventional bender of the type known as a "wing" type bender. Such is only diagrammatically illustrated in FIG. 10 and includes a stationary bottom support or die 71, the upper surface 72 having a generally channelled or corrugated profile corresponding to that of the roll-formed flat panel 30'. The flat panel 30' will be supported on the main support 71 so that a desired length thereof will project over a moveable bending tool 73, the latter typically having a flat upper surface so that it engages only the lower or flat bottom walls associated with the valleys of the panel member 30'. A top die or support 74 is disposed directly over the stationary support 71 and defines thereon a small radius (i.e. about two to three inch radius) rounded corner 77 which joins bottom surface 76 to an upwardly projecting surface 75. The bottom surface 76 as well as the upward surface 75, as well as the 90° rounded corner 77, all preferably have a corrugated profile which corresponds to the cross-sectional profile defined by the top surface of the roll-formed flat panel 30', whereby at least that portion of the flat panel 30' which projects inwardly (leftwardly in FIG. 10) from the moving pressing member 73 hence have profiles which effectively nestingly engage the flat panel 30' from the top side thereof. When so engaged, the pressing member 73 which engages solely the flat bottom surfaces of the valleys defined on the panel member 30' is moved upwardly, thereby causing the cantilevered portion 30" of panel member 30' to be bent upwardly around the corner 77 into a generally upright position so that the extension 30" hence is effectively moved into nesting engagement with the profiled upright surface 75. The moveable pressing member 73 may be moved vertically upwardly so as to progressively reshape the panel extension 30" about the curved corner die 77, or alternatively the pressing member 73 may be pivotally swung upwardly about an axis which is approximately aligned with the center of the curved corner 77 so as to engage the extension 30" over a longer extent to hence effect upward swinging and hence bending about the curved corner 77. Bending of this general type is known to those of ordinary skill in this technology, and further detailed description thereof is believed unnecessary.

Figure 11:
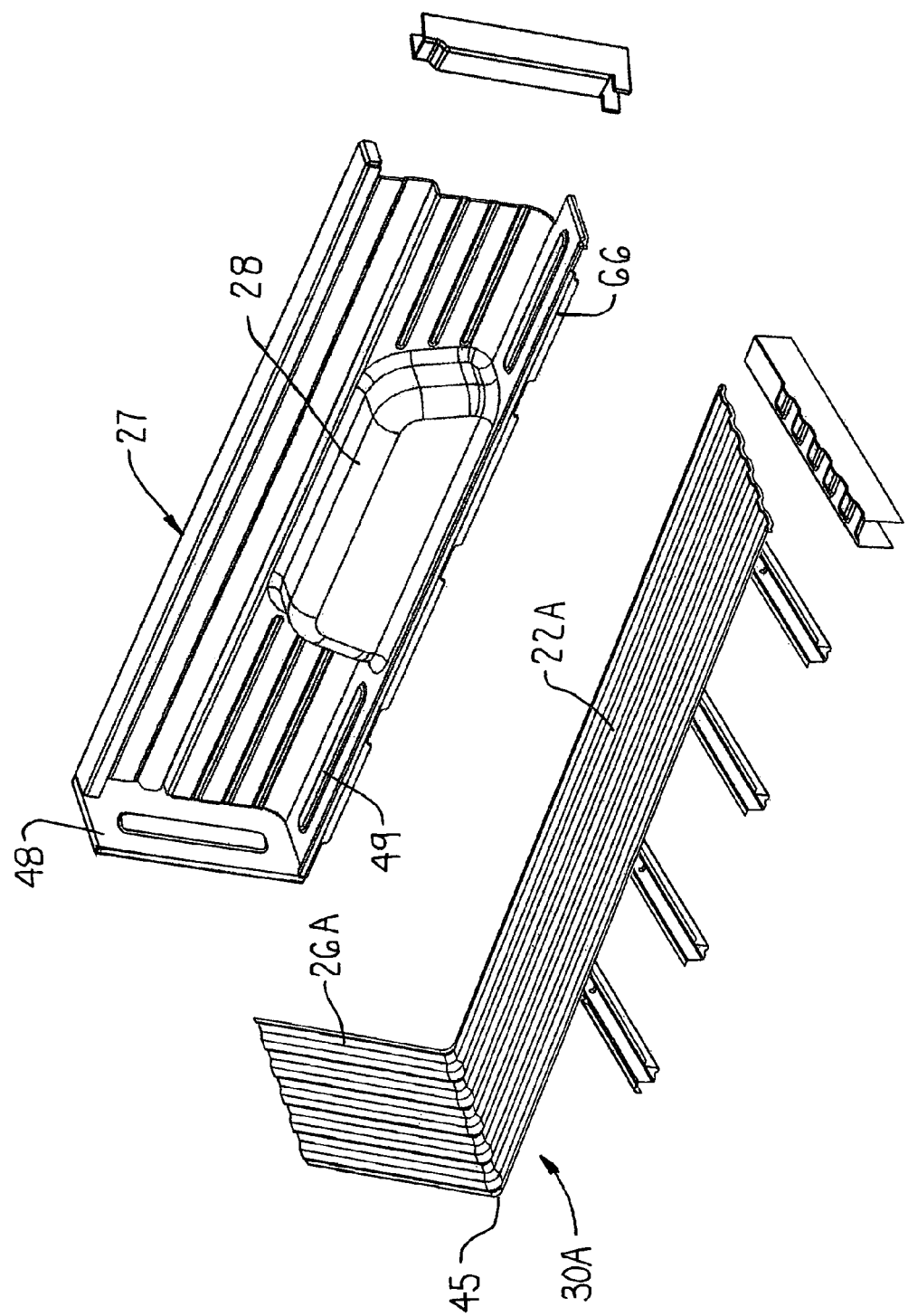
FIG. 11 is an exploded perspective view similar to FIG. 5 but illustrating a variation thereof.

As an alternate and preferred construction for the present invention, and referring to FIG. 11, there is illustrated a modified monolithic one-piece roll-formed panel 30A which is identical to the panel 30 described above except that panel 30A has a width which is designed to extend across only the main center load-bearing region of the box assembly, namely a width which approximately corresponds to the width between the wheel well housings 28. This narrower roll-formed panel member 30A hence has the sidewardly alternating stiffening ribs 33 and valleys 34 (as shown in FIG. 8) disposed in sideward but parallel relationship across substantially the entire width thereof. The L-shaped panel 30A cooperates with side panels and wheel well housings in generally the same manner as described above, except that in this situation there is additionally provided bed filler panel sections 49 which are disposed on opposite sides of the roll-formed bed panel 22A and extend along the upright side panels 27 so as to occupy the regions both rearwardly and forwardly of the wheel well covers 28. There is also provided front upright filler panels 48 which join to opposite upright edges of the roll-formed front panel 26A and extend outwardly for joinder to the respective inner side wall 27. These filler panels 48 hence cooperate with the front panel 26A so as to define the full-width front wall of the box assembly.

Figure 12:
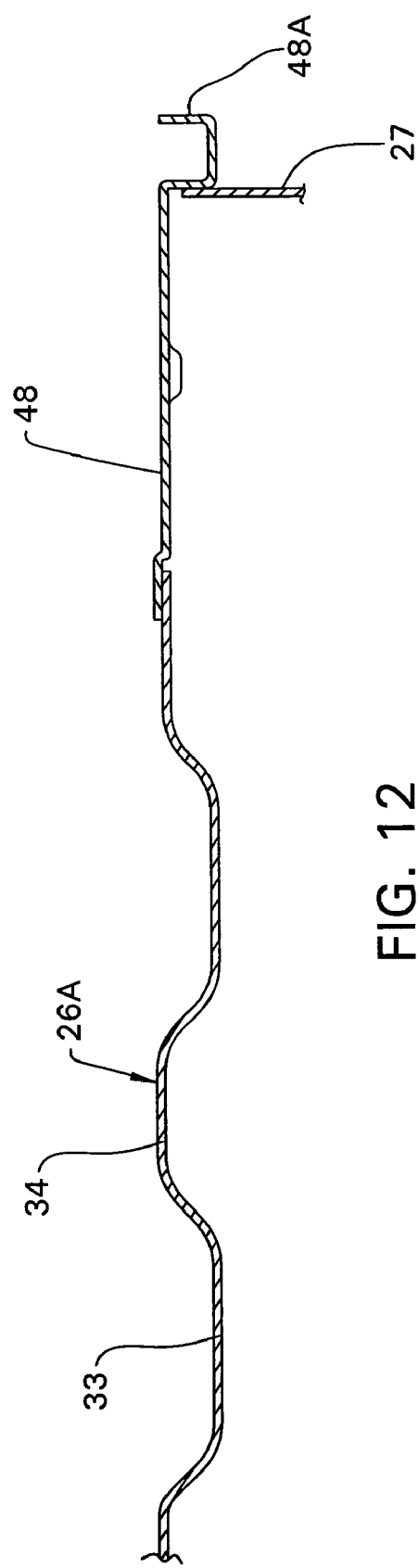
FIG. 12 illustrates an extension on the upright filler panel.

In the above construction, the bed panel section 22A and bed filler panels 49 are typically provided with down-turned edge flanges, such as indicated at 66 in FIG. 11, to permit the panels to be welded together. Front panels 26A and 49 can be similarly joined using flanges, or alternately can be provided with overlapping edge parts which can be welded together, as shown in FIG. 12.

The front filler panel 48 is preferably provided with an outward extension 48A which extends beyond the inner side panel 27 so as to be joined to the outer side (i.e. quarter) panel (not shown) in a conventional manner.

Figure 13:
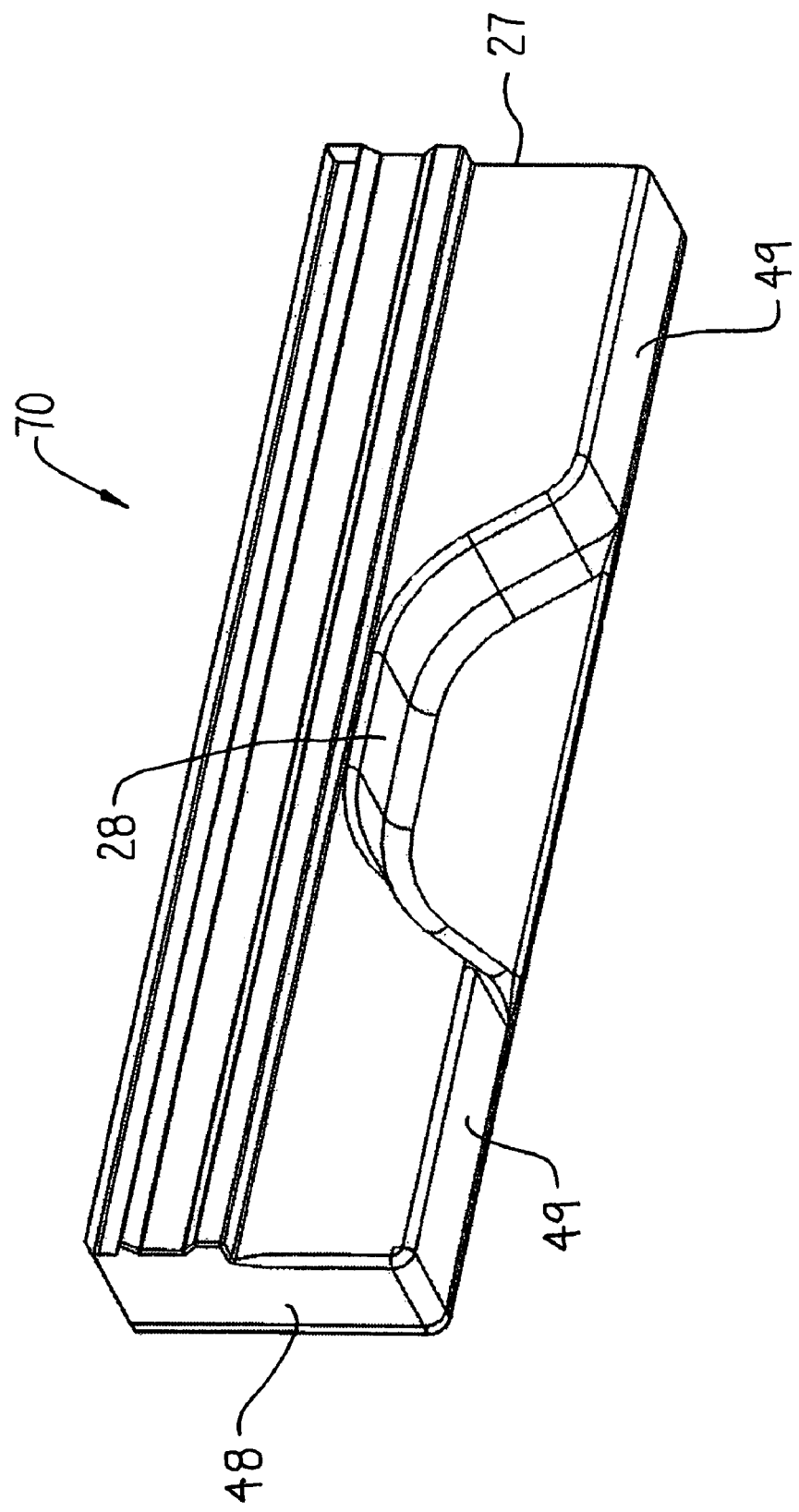
FIG. 13 illustrates a monolithic one-piece side panel assembly which can be preferably utilized in conjunction with the roll-formed front and floor panel member of FIG. 11.
Figure 14:
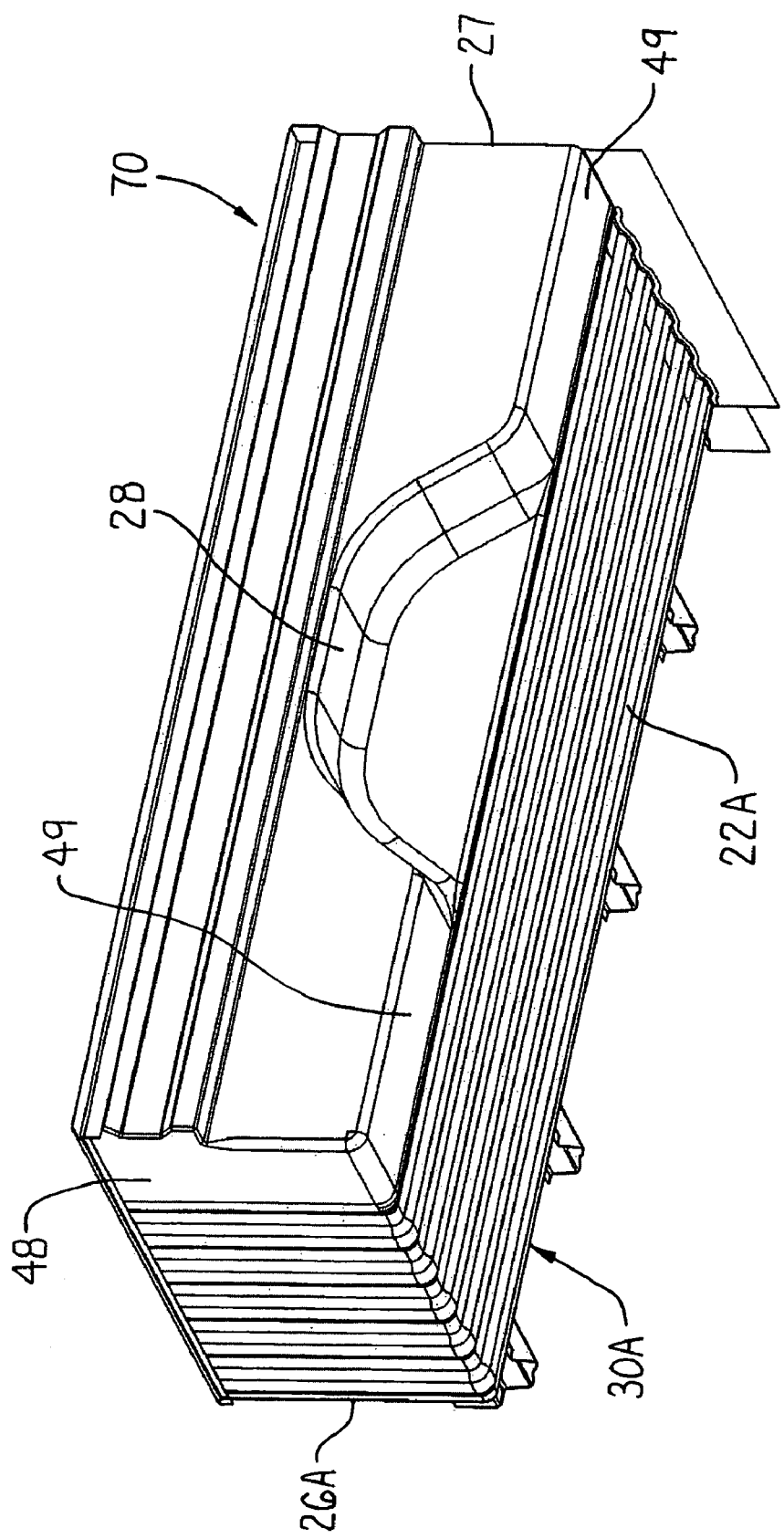
FIG. 14 illustrates the one-piece side assembly of FIG. 13 in assembled relationship with the roll-formed front and floor wall panel member of FIG. 11.

In the construction illustrated by FIG. 11, the inner side wall 27, wheel well cover 28 and associated bed and front filler panel sections 49 and 48, can be individual stamped pieces, but preferably are defined by a monolithic one-piece stamped assembly 70 (as shown in FIGS. 13 and 14), namely one-piece right and left assemblies stamped from thin sheet steel, as described in co-pending application Ser. No. 10/561,803, for cooperation with the roll-formed panel 30A as shown in FIG. 14.

When roll-forming panels for the box assembly in accordance with the present invention, it will be recognized that the width of the flat steel sheet, as provided in the coil, will substantially correspond to the width of the finished panel if flattened out into a planar condition, whereby trimming of the sheet or of the finished panel is generally unnecessary, and minimal usage of sheet material is achieved. Further, the roll-forming of the critical panels effectively eliminates or at least greatly minimizes stretching (i.e., thickness reduction) of the sheet during shaping of the panel, whereby a steel sheet of reduced thickness can hence be initially utilized to permit forming of the panel, particularly in comparison to stamped panels, and the resulting roll-formed panels are substantially of uniform thickness throughout. This hence minimizes the finished weight of the panel, reduces material costs, and greatly simplifies required tooling which significantly reduces tooling costs, and at the same time provides tooling having a significantly greater degree of flexibility. As to the actual design of the roll-former, it will be appreciated that the design of roll-formers involves the application of conventional techniques known to those of ordinary skill in the roll-forming art, whereby further description and explanation of the roll-former is believed unnecessary.

The roll-forming of the principal panels associated with the box assembly, as described above, is also advantageous inasmuch as this enables the panels to be more readily formed using high strength steel sheets, particularly thin steel sheets having a yield strength in the range of from about 50,000 psi to about 100,000 psi. High strength steel sheets can be more readily shaped and deformed by roll-forming so as to provide panels having the desired three-dimensional contour, specifically permitting use of deeper draws or formations than is typical with stamping, thereby additionally providing design opportunity to utilize thinner materials and provide greater weight reduction while also providing more severe (i.e. deeper) three-dimensional shapes.

It will be appreciated that roll-formed panels for use in a truck box, such as disclosed herein, can be and typically are provided with various attachment flanges. For example, flanges are typically provided on the edge of either the front panel or the side panel for permitting securement at the front corners of the box assembly, and are also provided around the wheel well opening when a separate wheel well housing is utilized. Such flanges can be formed, trimmed and shaped as desired utilizing conventional pressing and shaping dies, whereby further detailed description relative to such flanges is believed unnecessary.

The overall assembly of the box utilizing the improved panels of this invention is, for the most part, conventional whereby further description thereof is believed unnecessary.

Although particular preferred embodiments of the invention have been disclosed in detail for illustrative purposes, it will be recognized that variations or modifications of the disclosed apparatus, including the rearrangement of parts, lie within the scope of the present invention.

What is claimed is:

1. A pickup truck box assembly having a horizontally extending floor, a pair of inner upright side wall panels fixed relative to said floor adjacent opposite sides thereof and projecting upwardly therefrom, a pair of wheel well housings fixed to and protruding inwardly from the respective side wall panels, and an upright front wall panel fixed relative to said floor and projecting upwardly therefrom adjacent a front end thereof, comprising the improvement wherein the floor and the upright front wall panel over a width which at least approximately corresponds to the width between the wheel well housings is defined by a monolithic one-piece roll-formed sheet metal panel member having a plurality of parallel but sidewardly spaced roll-formed channel-shaped stiffening ribs extending longitudinally throughout the entire length thereof and terminating at opposite free ends of the panel member, said roll-formed sheet metal panel member having a substantially 90° arcuate bend section extending perpendicularly thereacross at a location spaced between the opposite free ends thereof to define a generally horizontal panel part which extends from the bend section to one of said free ends and functions as at least part of said floor and which is joined through said bend to an upright and generally vertical panel part which extends from the bend section to the other of said free ends and functions as at least part of said front wall panel, said channel-shaped stiffening ribs extending through the arcuate bend section, the other free end as defined on said vertical panel part effectively defining the upper edge of said front panel part, and a top rail fixedly joined to and extending lengthwise along the upper edge of the front wall panel.

2. A box assembly according to claim 1, wherein said roll-formed panel member has a width which generally corresponds to the full width of the box assembly and includes side panel portions which extend along and define opposite longitudinally extending side edges of the panel member, said side panel portions having wheel well openings formed therein.

3. A box assembly according to claim 2, wherein said side panel portions are free of roll-formed stiffening ribs and have a generally flat configuration.

4. A box assembly according to claim 1, wherein the stiffening ribs and valleys therebetween respectively define generally flat top and bottom walls, and wherein the flat top walls of the stiffening ribs have a width which is greater than the width of the flat bottom walls of the valleys.

5. A box assembly according to claim 1, wherein the one-piece roll-formed sheet metal panel member has a width which does not exceed the spacing being the pair of wheel well housings, and wherein the one-piece roll-formed panel member is positioned sidewardly between and fixedly joined to right and left monolithic one-piece stamped sheet metal side members each defining (1) the respective inner side wall panel, (2) the respective wheel well housing, (3) a side floor panel having portions disposed forwardly and rearwardly of the wheel well housing, and (4) an upright wall part which defines part of said front wall panel.

6. A box assembly according to claim 1, wherein the sheet metal panel member comprises a thin metal sheet of high strength steel having a yield strength in the range of about 50,000 psi to about 100,000 psi.

\* \* \* \* \*